April 14, 1964    J. C. HEBERT    3,128,657
PIVOTING TRACING TOOL
Filed Oct. 11, 1960    2 Sheets-Sheet 1

INVENTOR
JAMES C. HEBERT

BY Sughrue, Rothwell, Mion & Zinn
ATTORNEYS

April 14, 1964

J. C. HEBERT 3,128,657

PIVOTING TRACING TOOL

Filed Oct. 11, 1960

INVENTOR
JAMES C. HEBERT

BY *Sughrue, Rothwell, Mion & Zinn*

ATTORNEYS

United States Patent Office 3,128,657
Patented Apr. 14, 1964

3,128,657
PIVOTING TRACING TOOL
James C. Hebert, Springfield, Vt., assignor to Jones & Lamson Machine Company, Springfield, Vt.
Filed Oct. 11, 1960, Ser. No. 61,884
5 Claims. (Cl. 82—14)

This invention relates to improvements in turning machines for automatically reproducing contours by tracing from a template and more particularly relates to an automatic pivoting tracing tool attachment for such machines adapted for heavy cuts and full control for cutting opposing steps and similar difficult operations on workpieces.

One of the known prior constructions for cutting a step or 90° shoulder in a workpiece with a simple single dimension tracer controlled tool is by means moving the tool slide away from the work with a vector component of velocity sufficient to cancel a constant longitudinal feed; but this will provide a right angle shoulder only if the diameter is increasing. However, descending shoulders cannot be produced in the direction of feed and about the best previously known solution for this problem is the provision for reversing the direction of feed and utilizing another tool.

It is further known in the art of tracer controlled turning to utilize a tool which is tracer controlled about two perpendicular axes, one along the axis of the lathe and the other in a cross feed direction. With such two-way control, it is possible to machine opposing steps with square shoulders on both sides and similar difficult cuts because the longitudinal carriage feed can be stopped completely to accomplish facing movements while the cross slide is moved in and out. However, the real limitation on such a system is the shape of the cutting tool per se. The tool has to be able to cut on its face as well as on both sides, in order to cut straight sided opposed shoulders or steps. In other words, the tool has to be able to cut on 180° of its periphery and heavy heels are not permissible, thus heavy cuts cannot be made with the flimsy tools known in this type of operation.

In view of the foregoing, it is the principal object of this invention to provide an automatic pivoting tracing tool attachment for a turning machine of the profile tracing type to enable heavy cuts and the cutting of opposed shoulders or steps in the workpiece.

Other objects and advantages of the invention will be pointed out in the following description and claims and illustrated in the accompanying drawings, which disclose, by way of example, the principles of the invention and the best mode which has been contemplated of applying these principles.

Figure 1A:
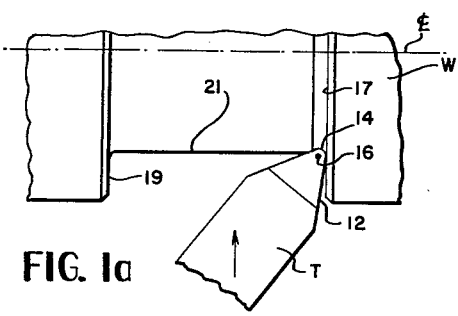
FIG. 1a illustrates a cutting tool of this invention utilized for cutting one shoulder of a stepped workpiece.
Figure 1C:
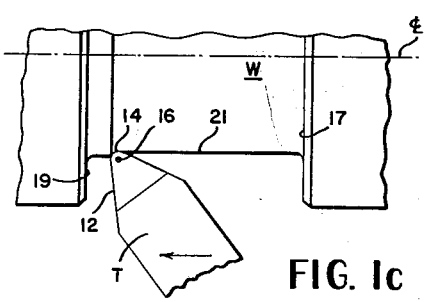
FIG. 1c shows the cutting tool after finishing of pivoting movement now in an angular position ready to cut the face opposing step.
Figure 1B:
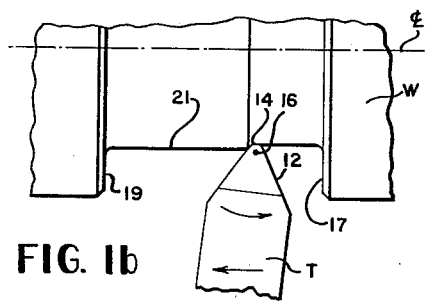
FIG. 1b shows the cutting tool pivoting about a cutting nose and longitudinally feeding during pivoting for cutting the workpiece between opposing steps.
Figure 1D:
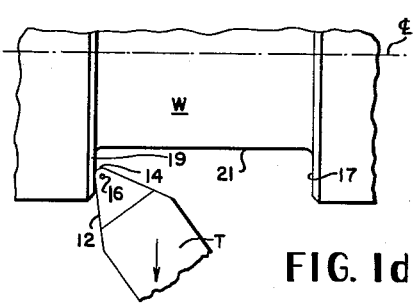
FIG. 1d shows the cutting tool of this invention cutting a step face opposite to that shown in FIG. 1a with the tool pivoted for most efficient cutting.

In general, this invention provides means for moving a cutting tool of a tracing lathe about the center of its cutting nose, the pivoting being done to place the tool in a better position to operate on difficult to machine profiles such as an opposed step or flank of the workpiece. Due to such pivotal movement the tool may cut on considerably less than 180° of its cutting face and actually contacts the workpiece only on a small portion of its nose or rounded cutting tip. The pivoting of the tool about a radius at its cutting nose allows good two-way control for cutting opposing shoulders and similarly difficult to cut workpieces and allows the use of a tool capable of long life with heavy cuts. Due to the fact that the tool is pivoted about the center defined by the arc of its cutting nose, the pivotal movement does not effect the size of the work before, during or after such movement.

Referring now to the drawings, in FIG. 1, there is shown a cutting tool T having a point portion 12 with a cutting nose 14, the cutting nose periphery being a portion of a circle defined by a radius from a center point 16. A workpiece W may have a pair of opposed shoulders or steps 17 and 19 as well as an intermediate section 21 therebetween to be machined. A workpiece of this shape is particularly difficult to machine in heavy cuts with a tracing lathe. As illustrated in FIG. 1a, the cutting tool T is positioned at an angle for efficient cutting on radial face or step 17 and by means of a two-way tracer control, the longitudinal feed slide is stopped and the cross slide is operated to cause the tool T to move in the direction of the arrow in FIG. 1a. After finishing the cut on the face of step 17, the tool as shown in FIG. 1b starts a longitudinal movement to machine the intermediate portion 21 between steps 17 and 19. During this longitudinal movement as indicated by the straight arrow on the tool T, the tool may be pivoted about the center of curvature 16 of its cutting nose 14 as shown by the curved arrow on the tool T without any adverse effect on the dimension of the intermediate portion 21 of the workpiece W. In other words, by rotating about the center of curvature 16 of the cutting nose 14, the effective position of the cutting tip periphery has not changed. As shown in FIG. 1c, the tool T may pivot from the cutting angle for cutting shoulder 17 (FIG. 1a) to an opposite position defining an efficient cutting angle for cutting the opposite shoulder or step 19. In FIG. 1d, the longitudinal feed has stopped and the radial out feed has started for machining the face of step 19. Also, the tool T has been rotated to a more efficient cutting position for cutting the step 19, thus allowing the use of a sturdier and heavier cutting tool for cutting the two opposed faces of steps 17 and 19.

Figure 2:
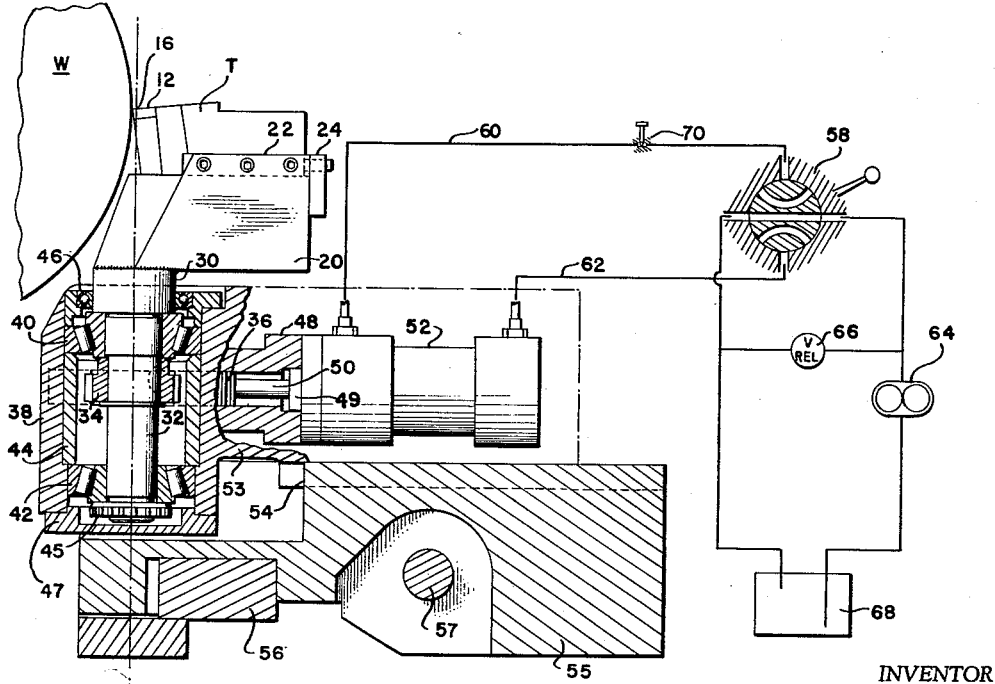
FIG. 2 is a side elevation of the apparatus of this invention with a portion broken away and shown in section for the sake of clarity, and a hydraulic system illustrated schematically.
Figure 3:
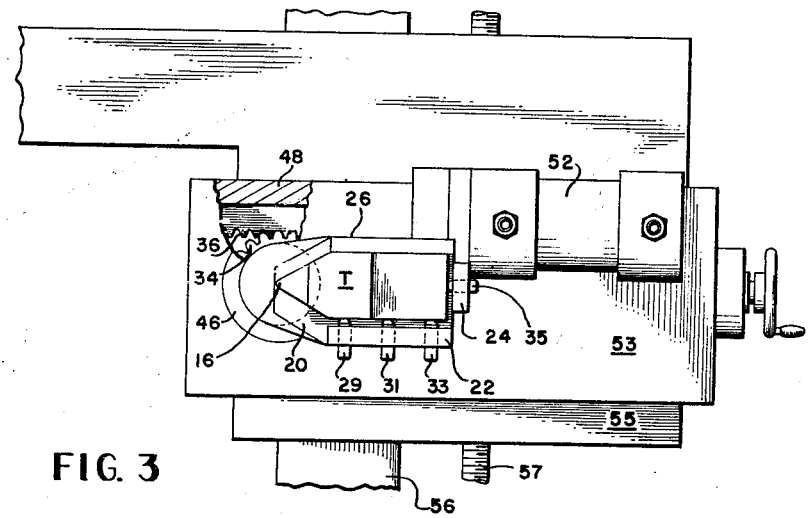
FIG. 3 is a top plan view of the apparatus of this invention with a portion broken away and shown in section for the sake of clarity.

The apparatus for accomplishing the pivotal movement of tool T about center 16 is illustrated in FIGS. 2 and 3, wherein the tool T including the cutting tip 12 is shown mounted on a tool holder 20. Projections 22 and 24 on the side and back of the tool holder 20 as well as projections 26 on the opposite side of the tool holder, together with screws 29, 31, 33 and 35 provide means for adjusting the tool T and for rigidly holding the tool on holder 20. Holder 20 is rigidly affixed to a rotatable support 30 which includes a shaft 32. Keyed to the shaft 32 is a pinion 34 for meshing with a rack 36. Shaft 32 is suitably journaled in a tool support housing 38 by means of tapered roller bearing assemblies 40 and 42 separated by a spacer 44, and held on by a nut 45. A suitable seal 46 and housing cap 47 may be utilized to keep the assembly free from dirt and the like. The tool support housing 38 and associated parts thus carry the pivotable mounting arrangement including shaft 32 necessary for pivoting tool T about its nose center 16.

Rack 36 is slideable in a housing 48 and is driven by a piston rod 50 of a hydraulic servo motor 52 of the well known expansible chamber reciprocating type. The entire tool supporting assembly is mounted on a lathe cross slide 53 slideable radially inwardly toward the workpiece by means of conventional lathe ways 54, and of course the cross slide is further mounted on a longitudinal slide 55 movable on lathe ways 56 by feed screw 57.

A hydraulic system for actuating the hydraulic servo motor 52 includes a selectively operable hydraulic valve 58 connecting either line 60 or line 62 at opposite ends of the servo motor, to a suitable source of fluid pressure as developed by a pump 64 which is provided with a pressure relief valve 66 to thereby control the application of hydraulic fluid pumped from a sump 68 to either end of the servo motor. The valve 58 may be suitably programmed to operate at an appropriate time during a cutting cycle by dogs tripping switches or by any other known means such as tape control and the like. Further, the speed of movement of the servo motor 52 can be controlled by a suitable regulatable orifice control 70 regulating the flow of the hydraulic fluid admitted to the servo motor 52. It can be seen that movement of the servo motor 52 causes movement of the piston rod 50 and the rack 36 rotating pinion 34 and shaft 32 to which it is fixed about its center and this center coincides with the center of curvature 16 of the tool point 14. Stops may be provided to limit the travel of servo motor 52 to position the tool T in either the position of FIG. 1a or the position of FIG. 1b. One such stop is defined by collar 49 on piston rod 50 abutting against a shoulder within housing 48. The tool T is adjusted in holder 20 so that its tool point is in a precisely determined position with center 16 coincident with the axis of shaft 32 and this adjustment is accomplished by means of the setting screws 29, 31, 33 and 35.

Figure 4:
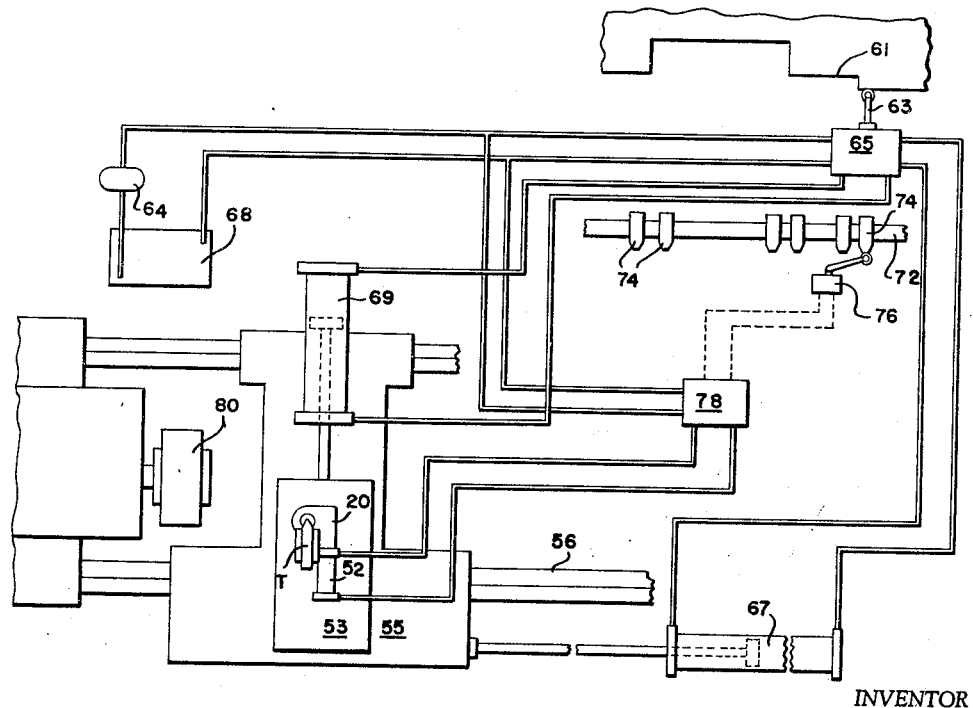
FIG. 4 shows how the apparatus of this invention could be applied to a two-way hydraulic control tracing lathe of the type known in the art for allowing such lathe to operate with much heavier cuts than previously known.

As an example of the pivoting tool attachment of this invention utilized in a two-way hydraulic automatic tracer lathe, reference may be had to FIG. 4. In a known type of tracing lathe, a tracing template 61 is followed by a tracer follower 63 operating a hydraulic control valve 65 for controlling longitudinal slide servo motor 67 and cross slide servo motor 69. The hydraulic circuit may be easily traced from a sump 68 through pump 64 and through control valve 65 and then on to servo motor 67 and to servo motor 69. Positioned in a predetermined relationship with the template 61 is a bar 72 containing a plurality of positionable dogs 74 for operating a valve controller 76 and controlling a valve 78. Valve 78 is in the hydraulic circuit between the pump 64 and sump 68 and the tool pivoting servo motor 52. The tool T and the tool pivoting servo motor 52 are carried on the tool support 20 and are movable with the longitudinal and transverse movements ordinarily afforded the lathe tool by means of servo motors 67 and 69. A lathe head 80 has also been shown, but the other elements of the lathe which are well known in the art have been omitted for the sake of simplicity in the explanation.

Although the invention has been described for outside profiling, it will be evident to one skilled in the art that the inventive concept may also be applied to inside profile tracing work. Furthermore, in addition to cutting opposing steps, the apparatus of this invention is particularly applicable in the turning of roller bearing races. Thus, while there has been disclosed a preferred embodiment of my invention, variations within the spirit of the invention may occur to those skilled in the art and the invention is defined by the appended claims.

I claim:

1. In combination with a template tracing machine of the type adapted to move a turning tool radially and axially relative to a rotatable workpiece for turning the same in accordance with a predetermined pattern on the template, an improved pivotable cutting tool attachment comprising; a tool support adapted to trace movements corresponding to a template pattern, a single turning tool mounted on said support and bodily movable therewith, said tool including a rounded cutting nose with a cutting periphery being at least a portion of a circle defined by a radius from a center point within the rounded cutting nose, means for pivotally mounting the tool on the tool support with the pivot point coincident with the center point of said portion of said circle of said rounded cutting nose, and means for moving said tool about its pivot so that said cutting tool may be pivoted to cut opposing steps while utilizing preselected efficient tool cutting angles.

2. In a machine tool for the turning of work, having a longitudinal slide and a cross slide independently movable under control of a template contour tracing arrangement, an improved cutting tool attachment comprising; a tool support movable with said cross slide and adapted to partake of all contour tracing movements, a cutting tool including a rounded cutting nose with a curvature at the cutting point defined by a radius from a center of curvature within the cutting tool, means for pivotally mounting said cutting tool on said tool support with the axis of pivotal movement coincident with the center of curvature of the cutting nose of the tool, and means for moving the tool about its pivot in response to tracing movement of said support so that said cutting tool is selectively pivoted to an efficient cutting angle according to profile of the work as determined by the template contour.

3. A device as defined in claim 2 wherein said means for moving the tool about its pivot include a hydraulically operated servo motor; a slideable rack driven by said servo motor to selective positions, a gear in mesh with said rack, the axis of said gear being coincident with the pivotal axis and the center of curvature of the cutting nose of the tool.

4. An automatic pivotable tool attachment adapted for use with a template tracing lathe comprising; a lathe cutting tool including a rounded cutting nose with a periphery having a circular portion being less than 180° of a circle and defined by a radius from a center of curvature within the rounded cutting nose, a tool support adapted to bodily support said tool for all template tracing movements of said lathe, a pivotable mounting for said tool on said support, the axis of said pivotable mounting being coincident with the center of curvature of said tool cutting nose, and power operated means for moving said tool about said pivotable axis so that said tool may assume different preselected cutting angles relative to the work.

5. An automatic pivoted tracing tool attachment for a hydraulic two-way template controlled lathe, the tool attachment comprising; a cutting tool including a rounded cutting nose less than semicircular in extent and defined by a radius from a center of curvature located within the nose, a tool holder rigidly holding the tool when the attachment is in use, adjustable means for adjusting the tool within the holder, a tool support movable in accordance with all template tracing movements of the lathe, a pivotable mounting means including a supporting shaft journaled in said tool support mounting said tool holder and rigidly held tool in said tool support on a pivotable axis coincident with the center of curvature of the tool nose,, a power motor operatively connected to said supporting shaft and adapted to rotate the same about its axis to at least two predetermined positions corresponding to efficient cutting angles for said tool, and means to actuate said motor automatically in accordance with the profile to be cut in the workpiece as determined by the template control.

References Cited in the file of this patent

UNITED STATES PATENTS

| | | |
|---|---|---|
| 431,578 | Guerrant | July 8, 1890 |
| 2,168,633 | Smith | Aug. 8, 1939 |
| 2,465,393 | Obadiah | Mar. 29, 1949 |
| 2,715,848 | Schmidt | Aug. 23, 1955 |

FOREIGN PATENTS

| | | |
|---|---|---|
| 904,081 | France | Feb. 12, 1945 |